(12) United States Patent
Aull et al.

(10) Patent No.: US 7,047,409 B1
(45) Date of Patent: May 16, 2006

(54) AUTOMATED TRACKING OF CERTIFICATE PEDIGREE

(75) Inventors: Kenneth W. Aull, Fairfax, VA (US); Vincent J. McCullough, Chantilly, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 838 days.

(21) Appl. No.: 09/690,279

(22) Filed: Oct. 16, 2000

Related U.S. Application Data

(60) Provisional application No. 60/210,466, filed on Jun. 9, 2000, provisional application No. 60/229,336, filed on Sep. 1, 2000.

(51) Int. Cl.
 *H04L 9/32* (2006.01)
(52) U.S. Cl. ............... 713/173; 713/156; 713/175; 713/185; 726/9
(58) Field of Classification Search ........ 713/156–158, 713/159, 172, 173, 166, 175
See application file for complete search history.

(56) References Cited

U.S. PATENT DOCUMENTS

| | | | | |
|---|---|---|---|---|
| 5,311,591 A | * | 5/1994 | Fischer ................ | 713/156 |
| 5,539,828 A | * | 7/1996 | Davis .................. | 713/173 |
| 5,721,781 A | * | 2/1998 | Deo et al. ............ | 705/67 |
| 5,781,723 A | | 7/1998 | Benaloh et al. ...... | 713/200 |
| 6,134,593 A | * | 10/2000 | Alexander et al. .... | 709/229 |
| 6,308,273 B1 | * | 10/2001 | Goertzel et al. ...... | 713/201 |
| 6,367,011 B1 | * | 4/2002 | Lee et al. ............. | 713/172 |
| 6,516,416 B1 | * | 2/2003 | Gregg et al. ......... | 713/201 |
| 6,609,198 B1 | * | 8/2003 | Wood et al. .......... | 713/155 |

FOREIGN PATENT DOCUMENTS

| | | |
|---|---|---|
| JP | 11-25045 | 1/1999 |
| WO | WO 00/04673 | 1/2000 |
| WO | WO 200004673 A1 * | 1/2000 |
| WO | WO 00/54125 A | 9/2000 |

OTHER PUBLICATIONS

European Search Report for EP 01 11 2855 completed Nov. 30, 2004.

* cited by examiner

*Primary Examiner*—Gregory Morse
*Assistant Examiner*—Matthew Heneghan
(74) *Attorney, Agent, or Firm*—Tarolli, Sundheim, Covell & Tummino LLP

(57) ABSTRACT

A method of automatically tracking a certificate pedigree is provided, in which a new user is provided with a piece of hardware containing a predetermined pedigree certificate stored therein, the predetermined pedigree certificate having a level of trust bearing a relationship to a category of hardware of which the provided piece of hardware is a member. An automated registration arrangement is provided which can be accessed only by users having a piece of hardware containing a predetermined pedigree certificate having a specified level of trust stored therein. When the new user accesses the automated registration arrangement using the provided piece of hardware, the automated registration arrangement provides the new user with an individual signature certificate having a level of trust commensurate with that of the pedigree certificate. The automated registration arrangement flags the new user's individual signature certificate with the level of trust of the pedigree certificate in an appropriate storage area, including the certificate itself.

18 Claims, 3 Drawing Sheets

AUTOMATED TRACKING OF CERTIFICATE PEDIGREE

CROSS-REFERENCE TO RELATED APPLICATIONS

This application claims the benefit of U.S. Provisional Appn. No. 60/210,466, filed Jun. 9, 2000, and Provisional Appn. No. 60/229,336, filed Sep. 1, 2000, the contents of which are expressly incorporated by reference herein.

BACKGROUND OF THE INVENTION

1. Field of the Invention

The present invention relates to digital certificates in a PKI (Public Key Infrastructure). More particularly, the present invention relates to the automated tracking of a certificate pedigree of digital certificates in a PKI to enable a determination as to the trustworthiness of a digital certificate.

2. Description of the Related Art

A PKI is a set of policies, procedures, and software that permit an organization to generate, issue, and manage public/private cryptographic keys in a manner that allows users to reliably determine the identity of the owner of each public/private key pair. The key components of a PKI include: (1) a mechanism for reliably conveying the identity of a key pair's owner to the end user; (2) software applications for generating and managing key pairs that support this mechanism; (3) a set of procedures for generating and revoking key pairs that ensures that the identity of the owner can be reliably determined; and (4) a set of policies defining who may obtain public/private key pairs and identifying how each pair may be used.

As to component (1) of a PKI, most PKIs establish that the user owns a key pair by using an electronic document called a digital certificate. Digital certificates contain information identifying the owner of the key pair, the public component of the pair, and the period of time for which the certificate is valid. The digital certificate also identifies technical information about the key itself, such as the algorithm used to generate the key and the key length.

Certificates are generated by organizations that are responsible for verifying the identity of individuals, or in some instances, other organizations to which certificates are being issued. The identity of the certifying organization, referred to as a certificate authority, is recorded in each certificate, which is then signed using a private key known only to the certificate authority itself. This allows users to verify both the integrity of the certificate and the identity of the authority that issued it.

Certificate authorities generally employ any of a number of different commercially available software products to manage the creation, renewal, and revocation of certificates. These Certificate Management Systems (CMS) take information obtained through the user registration process, create a certificate, and sign it with the certificate authority's private key. The applicable CMS software maintains a database of all of the certificates that it has issued, and their statuses. The CMS is also responsible for revoking certificates, and for publishing a certificate revocation list that identifies the date on which each certificate was revoked, and the reason for the revocation. This information allows relying users (that is, those individuals or systems that are performing encryption or signature verification actions based on certificates) to review the status of a certificate, to assess its usability. A list of distribution points from which the CRL can be obtained are identified in the certificate itself.

In issuing a certificate, a certificate authority is stating that is has verified that the public key that appears in the certificate (and, by extension, the corresponding private key) belongs to the individual listed in the certificate. The integrity with which the registration process operates is therefore of great importance. The process must provide mechanisms for reliably identifying an individual and for verifying that the public key listed in the certificate belongs to that individual. Equally important, the certificate authority must provide procedures for revoking certificates in the event that the private key is compromised. A compromised private key calls into question the entire basis for trusting a certificate, since more than one individual may be using that private key to sign documents, or more than one individual may be able to decrypt documents encrypted using the corresponding public key.

Relying individuals and organizations must have a clear understanding of their certificate authority's operation processes. As a result, most certificate authorities publish a Certificate Practice Statement (CPS) that details the processes for registering users, issuing certificates, renewing certificates and revoking certificates. The CPS is normally published on the certificate authority's website.

Certificates often contain additional information that identifies an individual as a member of a particular organization and perhaps the role that they play in the organization. For example, the certificate may identify the certificate holder as being an employee of a company or a customer or subcontractor or supplier of the company. The policies determining who is eligible to hold a certificate are therefore important if individuals and organizations are to rely upon this information. These policies govern the overall operation of the certificate authority.

The policies under which users register for certificates determine the initial degree of trust that a relying party should place in a certificate. However, the manner in which the public key associated with the certificate is protected is equally as important. Private keys may be stored in any of several different ways. They may be placed on password protected public storage media, such as directories or databases. They may also be stored on password protected media accessible only to the certificate holder or to a relatively small number of persons, such as a floppy disk, the hard drive of the certificate holder's personal computer, or a portable storage device such as a smart card. A more secure storage medium is provided by hardware tokens containing encryption "engines." These hardware tokens actually generate and store the private key and perform all encryption/decryption functions within the token. Hardware tokens typically require a password to activate and, since they remain in the possession of the certificate holder at all times, are substantially more secure than other storage media.

In a manual registration process, a human registration agent may ascertain the nature, or "pedigree," of the storage media on which the certificate and its corresponding private key are stored. When the process of issuing a digital certificate is automated, there is no way of keeping track of the "pedigree" of the certificate which was generated. That is, was the certificate originally generated on a client PC or on a smart card or on a hardware token? The different categories of hardware computing devices are all capable of generating digital certificates which, from a software standard, are identical in format and content.

The pedigree of the digital certificate can have a significant bearing on the business functions to which that certificate is applied. That is, a certificate generated on a client PC will typically be less trustworthy than a certificate generated on a hardware token in that hardware tokens are typically more difficult for hackers to compromise than conventional PCs and hence certificates generated by such tokens have a higher level of trust. Accordingly, unless the PKI can keep track of the pedigree of the certificate, one may not know what level of trust to place on business functions associated with that certificate.

Unfortunately, earlier PKI registration processes provide no automated mechanism for tracking the pedigree of a certificate, that is, they provide no mechanism for keeping track of what kind of hardware was used to generate the private/public key pair. In cases where pedigree checking has been required, the tracking was performed manually. Manual tracking is expensive and time-consuming.

SUMMARY OF THE INVENTION

In accordance with the present invention, a new category of certificate, called a "pedigree certificate" is created. A single pedigree certificate may be shared in common among all elements of a given category of hardware. For example, all smart cards having identical security properties will be loaded with a common pedigree certificate and its associated private key. This pedigree certificate will be loaded only onto these smart cards, and will be used for no other purpose.

In accordance with the present invention, specific categories of hardware, such as smart cards or USB (Universal Serial Bus) tokens, are pre-loaded with a pedigree certificate and associated private key designating the hardware type, one pedigree certificate being designed for each category of hardware.

In accordance with the present invention, an automated registration arrangement, such as special Registration Web pages on the Internet, can be accessed only via the associated pedigree certificate, one Web page for each pedigree certificate, for example. Accordingly, if a user accesses one of the special Registration Web pages, the user must be employing the special hardware of the corresponding category since only that category of hardware possesses the requisite pedigree certificate and associated private key. Thus, the user can be issued a digital certificate having a level of trust commensurate with the pedigree certificate of the special hardware of the user.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
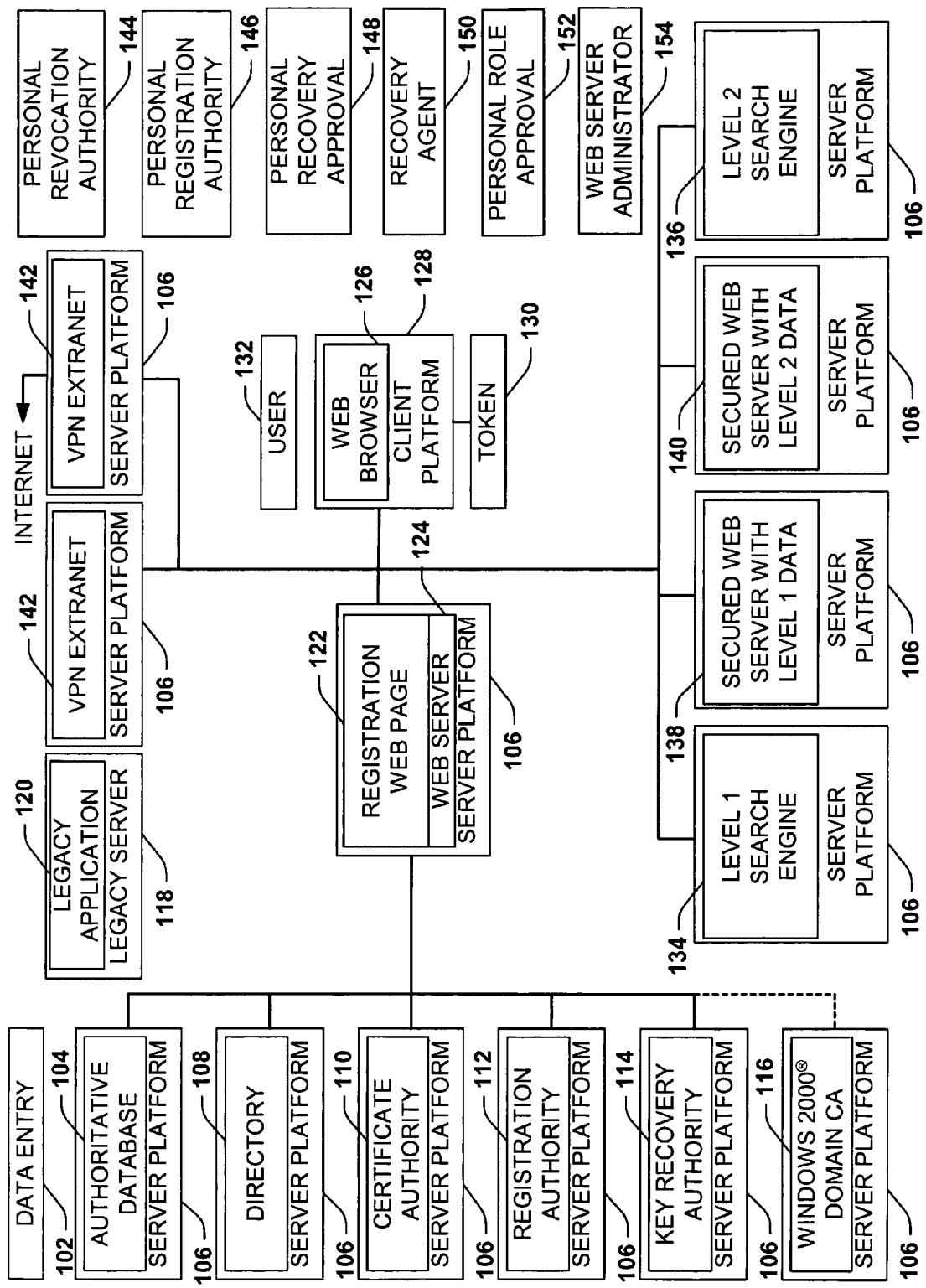
FIG. 1 is a block diagram illustrating an exemplary architecture of a network in which the PKI processes of the present invention may be practiced.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Lastly, well-known components and connections have not been shown within the drawing figures for simplicity of illustration and discussion and so as not to obscure the invention.

FIG. 1 illustrates an exemplary architecture of a network 100 in which the Public Key Infrastructure (P.K.I.) processes of the present invention may be practiced. However, it should be understood that the present invention is not limited to the network 100 of FIG. 1. The network 100 includes data entry 102, which performs a data entry function for authoritative database 104, which is resident on the server platform 106. A server platform 106 is referred to in this description, but it should be understood that the present invention is not limited to any particular server architecture. The server platform 106 may be, without limitation, a UNIX® or WINDOWS NT® server. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification, etc., of the members of the group or enterprise. Directory 108 has the structure of the database but is optimized for fast look-up of information stored therein rather than fast data entry. The data in the directory 108 is not changed frequently but is required to be accessed rapidly and functions on-line as a fast phone book, containing reference information in the authoritative database 104. Certificate authority 110 is off-the-shelf software executed on server platform 106, providing storage of certificates and related information used by the present invention as described in more detail hereinafter. Registration authority 112 is also off-the-shelf software executable on server platform 106 regarding registration performed by the present invention as described in more detail hereinafter. Key authority 114 is also off-the-shelf server software which is executable on server platform 106 for recovering keys from members of the group or enterprise as described in more detail hereinafter. WINDOWS 2000® Domain CA 116 may use certificates provided by the present invention for a single sign-on to the network 100 of FIG. 1. Legacy server 118 executes legacy application programs 120. The legacy server may be, without limitation, a main frame, minicomputer, workstation, or other server hosting legacy software applications that are designed to be run on PKI processes in accordance with the present invention. The legacy applications 120 are accessible on the client side by a custom client 128 such as an emulator or custom database Graphic User Interface (GUI). Examples of emulators are terminal emulators of an IBM® 3270 or terminal emulators of a VT 100. Registration web page 122, which may be one or more pages, functions as the user interface to the network 100 of FIG. 1. Web server 124 is a software application which serves Web Pages, such as Web Page 122 or other HTML outputs, to a web browser client which may be, without limitation, APACHE® or MICROSOFT® Internet Information Server. Web browser 126 is resident on client platform 128 which may be any user computer. Web browser 126 is a client software application for browsing web pages such as but not limited to, HTML or XML protocols or other protocols. The Web browser 126 is programmed to operate with PKI certificates issued by the certificate authority 110. Examples of web browsers which have this capability are NETSCAPE NAVIGATOR® and the MICROSOFT INTERNET EXPLORER®. The token 130 is a smart card, USB (United Serial Bus), or other hardware token capable of generating, storing, and using PKI certificates. A user 132 is a person using the network 100. A user 132 transitions though a number of states which include a new user, current user, and a former user who no longer is a member of the group or enterprise. The network 100 is described with reference to two levels of security, but the number of the levels of security is not a limitation of the present invention, with each level corresponding to a different security requirement. The level 1 search engine 134 is a search engine which is permitted to search through the network 100 but is allowed access to only level 1 data, which is the lowest level of security and may be, without limitation, data which is freely distributable. Level 2 data may be considered to be proprietary. Level 2 search engine 136 is a search engine which is allowed to search through both level 1 and level 2 data. A level N search engine (not illustrated) is a search engine which is allowed to search through servers possessing data levels 1 through N. A secured level server with level 1 data 138 is a Web server containing only level 1 data, which is secured so that users must have level 1 access (at least) to access the server. A secured Web server with level 2 data 140 is a Web server that contains level 2 data which has been secured so that users must have level 2 access, with level 2 users having access to both level 1 and level 2 servers. A secured Web server with level N data (not illustrated) is a Web server that contains level N data which is accessible by a user with level N or above access. VPN Extranet 142 is a software application which functions as a network gateway which, is illustrated, may be either to legacy server 118 and legacy application 120 or to an external network such as the Internet. Personal revocation authority 144 is a person who is in charge of revocation of members from the network 100. Personal registration authority 146 is a person who is in charge of registration of members in the network 100. Personal recovery approval 148 is a person in charge of obtaining recovery of certificates. A Recovery Agent 150 is a person who performs recovery of certificates and may only recover a certificate if the certificate has first been designated as recoverable by another person. Personal role approval 152 is a person who approves different role functions within the network 100. A Web server administrator 154 is in charge of various web functions in the network 100.

Figure 2:
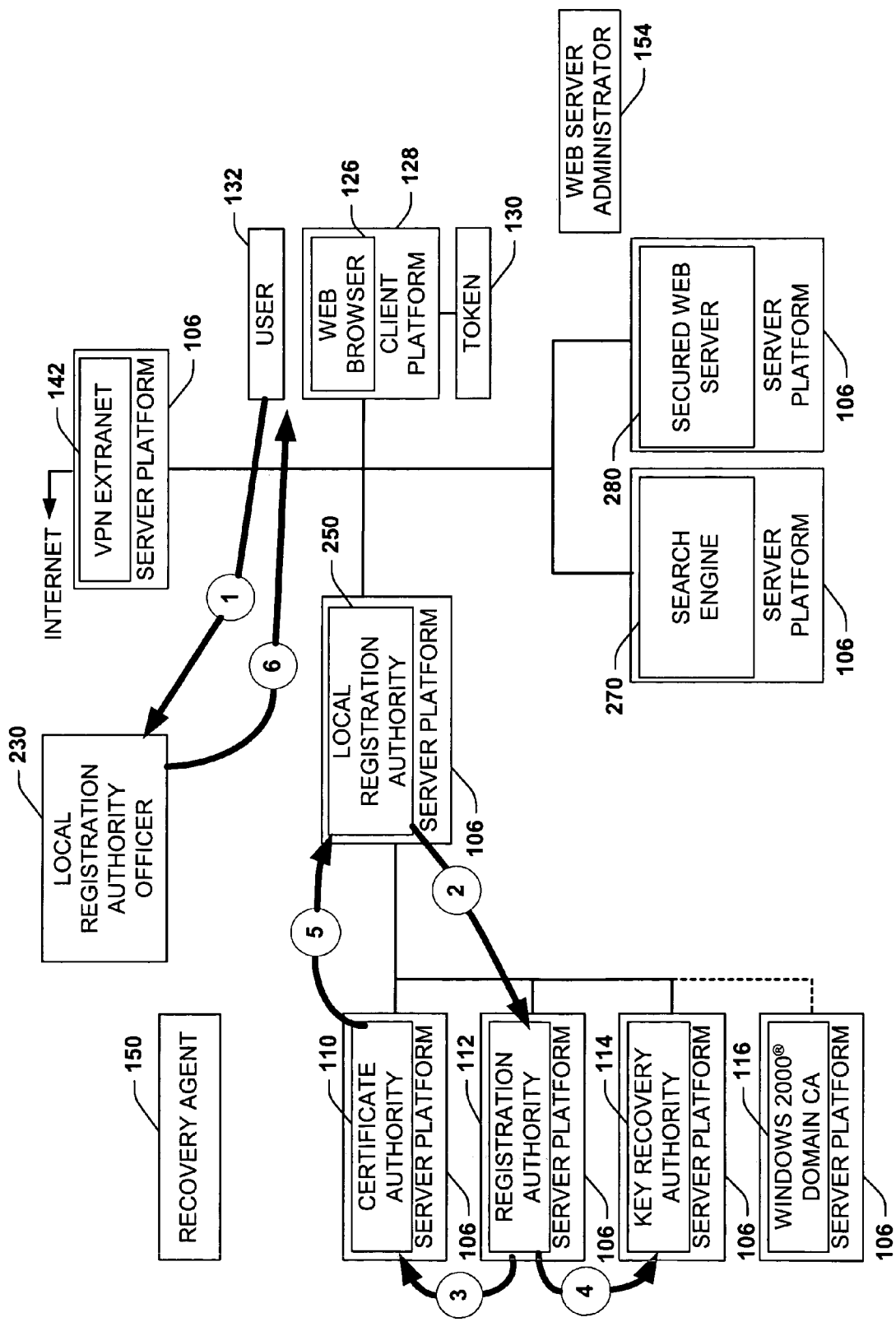
FIG. 2 is a partial block diagram illustrating the steps performed by a manual technique for generating a signature certificate with pedigree tracking.

FIG. 2 illustrates a partial block diagram of a network bearing some features in common with that of the network 100 of FIG. 1. FIG. 2 has been provided to enable the discussion of a manual technique for generating a signature certificate. Elements in FIG. 2 which correspond to those of FIG. 1 have been labeled with the same designation numbers. Note that the level 1 and level 2 search engines 134 and 136 of FIG. 1 have been replaced by the single search engine 270 and the secured Web servers 138 and 140 of FIG. 1 have been replaced by the single secured Web server 280.

In step 1 of FIG. 2, the user 132 physically presents a photo ID to the Local Registration Authority Officer (LRAO) 230. In step 2, the LRAO 230 then uses software contained in the local registration authority 250 to signal the registration authority 112 to register the new user 132. In step 3, a public/private key pair is generated by either the local registration authority 250 software or the registration authority 112 software, depending on the products chosen and depending on how they've been configured. The public key is sent to the certificate authority 110 to be signed, thereby generating a "certificate". In step 4, a backup copy of the private key may also optionally be sent to the key recovery authority 114. In step 5, the user's certificate is fowarded to the local registration authority 250. In step 6, the LRAO 230 copies the certificate (including the private key) onto a floppy disk or hardware token 130 or other storage medium and then physically hands the stored certificate and private key to the user 132. The LRAO 230 must manually mark the database or log with the pedigree of the certificate.

Figure 3:
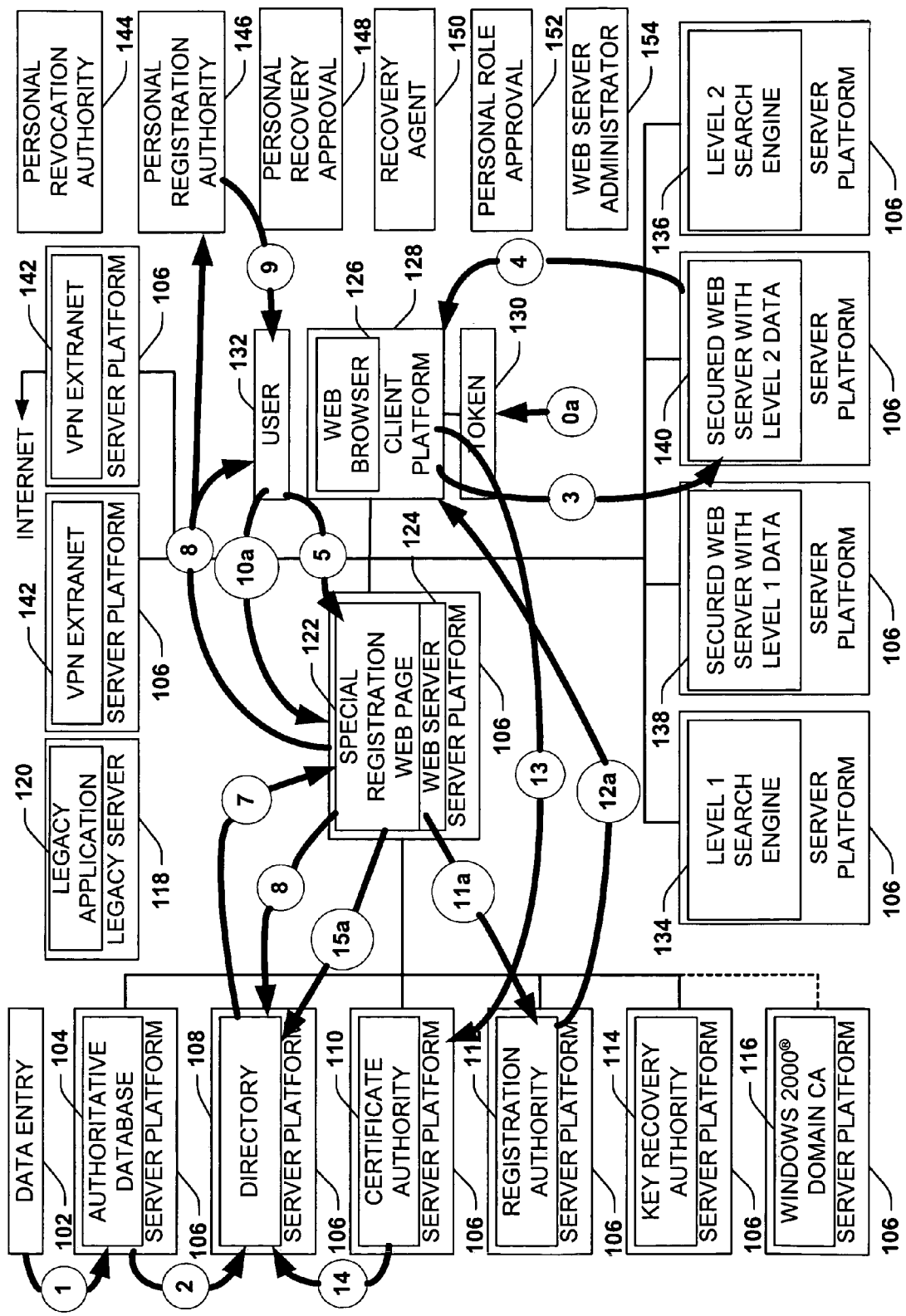
FIG. 3 is a block diagram illustrating the steps performed in accordance with an embodiment of the technique of the present invention.

FIG. 3 illustrates the block diagram of FIG. 1, showing the steps for obtaining a signature certificate with the automated tracking of the certificate pedigree in accordance with an embodiment of the present invention.

In step 0a of FIG. 3, a hardware token 130 is provided. This token will be used to generate private/public key pairs and is pre-loaded with a pedigree certificate and associated private key prior to being provided to the user 132. In step 1 of FIG. 3, data regarding the new user 132 is entered into the authoritative database 104. The authoritative database 104 contains information about the members of the enterprise including data necessary to send registration materials to new users. This information may include the home or work addresses, e-mail addresses, telephone or fax numbers, etc. In step 2, the data stored in the authoritative database 104 is periodically frequently replicated to the system directory 108. In step 3, the new user 132 attempts to access one of the enterprise Web servers 138 or 140. Since the new user 132 does not have a signature, the new user 132 does not present a signature to the Web server 140 and accordingly, the Web server 140, in step 5, redirects the new user 132 to the special registration Web page 350. At that point, the new user 132 identifies itself to the special registration Web page 350. In step 6, the special registration Web page 350 queries the directory 108 to obtain information about the new user 132. In step 7, the directory 108 provides information about the new user to the special registration Web page 350.

In step 8 of FIG. 3, the special registration Web page 350 sends the new user 132 a piece of information required to generate a new signature. A different piece of information is sent to the personal registration authority 146. Typically the information will take the form of a PIN or password.

In step 9, the personal registration authority 146 delivers registration information to the new user 132 in a face-to-face meeting. In step 10a, the new user 132 revisits the special registration Web page 350 and can forward the requisite registration information. The special registration of the Web page 350 can only be accessed by using a hardware token 130 that has been pre-loaded with the requisite pedigree certificate and associated private key (from step 0a). In step 11a, the registration Web server 124 signals the registration authority 112 to register the new user 132 possessing the hardware token 130 and in step 12a, the registration authority 112 signals the client platform 128 to generate a private/ public key pair on the hardware token 130. Before the public key is sent to the certificate authority, the token can sign the certificate request before the certificate leaves the token, using the private key. This allows the certification authority to know that the pedigree is valid for the highest level of assurance in the reliability of the key storage mechanism. In step 13, the public key is sent from the client platform 128 to the certificate authority 110, which records the certificate pedigree as a certificate policy object identifier (OID) in the certificate itself. Before signing the certificate, the certification authority validates that the certificate request was signed by the token itself. This makes any Trojan horse attack impossible because only a valid token, with the valid private key for a specific pedigree could have signed the request. In step 14, the certificate authority 110 sends the signed certificate (with public key) to the directory 108. In step 15*a*, the registration Web server 124 alerts the directory 108 that this certificate was generated on the hardware token 130. The Web server 124 knows this because of the fact that only a user 132 having a hardware token 130 would have been able to access the special version of the registration Web page 350.

Thus, if there are one or more categories of computing devices which are able to generate digital certificates and if one wishes to track which certificates in an enterprise were generated by a given category of devices, then in accordance with the present invention, a pedigree certificate is assigned to each category of device for certificates which are to be tracked and these pedigree certificates are pre-loaded in those devices. An automated registration process is provided which allows access only by individuals possessing that pedigree certificate. The process is configured so that individual certificates can be generated and so that it can record those instances in which a given individual certificate was generated using this process. The recording can occur inside a database, a directory, or any other persistent data storage area, and is also labeled as a certificate policy OID in the certificate itself.

As a concrete example, assume that Alice Jones wishes to use an automated PKI registration process to generate her signature certificate. Alice obtains a hardware token from her employer that has been factory pre-loaded with a pedigree certificate called "Level 3 Trust." Alice uses the hardware token to access the automated PKI registration process. If Alice were not able to present the "Level 3 Trust" certificate to the PKI registration process, the registration process would deny her attempt to generate an individual signature certificate. However, since Alice does have the requisite "Level 3 Trust" pedigree certificate, the PKI registration process consents to her request and more importantly, the PKI registration process knows that Alice must have used a hardware token to access the process. Accordingly, the PKI registration process can flag Alice's individual certificate as being a "Level 3" certificate in associated databases and directories. In other words, the pedigree of Alice's certificate has been successfully tracked automatically without requiring special intervention from another person. Furthermore, each certificate request must be specifically signed by the private key associated with the trust level of the certificate. This approach moves the "trust boundary" from the uncontrolled user computer to the controlled token itself.

An advantage of the present invention is that it allows existing commercial products and network standards to accomplish a new kind of functionality, that is, the automated tracking of the pedigree of an individual certificate. As a consequence thereof, PKI systems that are highly automated can now enjoy a feature that was previously only available with manually intensive PKI systems. Thus, the use of this invention yields a significant cost saving when applied to both existing and future PKI system architectures.

This concludes the description of the example embodiments. Although the present invention has been described with reference to illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of automatically tracking a certificate pedigree comprising:

providing a new user with a piece of hardware containing a predetermined pedigree certificate stored therein, the predetermined pedigree certificate having a level of trust commensurate with a category of hardware of which the provided piece of hardware is a member;

providing an automated registration arrangement which can only be accessed by users having a piece of hardware containing a predetermined pedigree certificate having a specified level of trust stored therein;

signing a certificate request by the provided piece of hardware using a private key associated with the predetermined pedigree certificate to provide the new user with the individual signature certificate; and providing the new user with an individual signature certificate from the automated registration arrangement upon the new user accessing the automated registration arrangement using the provided piece of hardware, the individual signature certificate having a level of trust commensurate with that of the pedigree certificate and wherein the automated registration arrangement flags the new user's individual signature certificate with the level of trust of the pedigree certificate in an appropriate storage area.

2. The method of claim 1, further comprising providing the user with at least two pieces of information, wherein, upon the new user accessing the automated registration arrangement, the automated registration arrangement requires the user to provide the at least two pieces of information prior to providing the individual signature certificate to the user.

3. The method of claim 2, wherein one of the at least two pieces of information is provided to the user by the automated registration arrangement in response to the user providing an additional piece of information to the automated registration arrangement.

4. The method of claim 3, wherein one of the at least two pieces of information is provided to the user by a personal registration authority.

5. The method of claim 2, wherein one of the at least two pieces of information is provided to the user by a personal registration authority.

6. The method of claim 2, wherein each of the at least two pieces of information comprises one of either a PIN (Personal Identity Number) or a password.

7. The method of claim 1, wherein the provided piece of hardware comprises one of a personal computer or a smart card or a hardware token.

8. The method of claim 1, wherein the automated registration arrangement comprises a special registration Web page.

9. The method of claim 1, further comprising validating that the certificate request was signed by the provided piece of hardware by verifying that the private key is associated with the predetermined pedigree certificate contained within the provided piece of hardware.

10. An apparatus for automatically tracking a certificate pedigree comprising:
- a piece of hardware containing a predetermined pedigree certificate stored therein, the predetermined pedigree certificate having a level of trust commensurate with a category of hardware of which the provided piece of hardware is a member;
- an automated registration arrangement which can only be accessed by users having a piece of hardware containing a predetermined pedigree certificate having a specified level of trust stored therein;
- a private key associated with the predetermined pedigree certificate, the private key being operative to sign a certificate request to provide the new user with an individual signature certificate;
- wherein, upon a new user accessing the automated registration arrangement using the piece of hardware, the automated registration arrangement provides the new user with the individual signature certificate having a level of trust commensurate with that of the pedigree certificate and wherein the automated registration arrangement flags the new user's individual signature certificate with the level of trust of the pedigree certificate in an appropriate storage area.

11. The apparatus of claim 10, further comprising at least two pieces of information, wherein, upon the new user accessing the automated registration arrangement requires the user to provide the at least two pieces of information prior to providing the individual signature certificate to the user.

12. The apparatus of claim 11, wherein one of the at least two pieces of information is provided to the user by the automated registration arrangement in response to the user providing an additional piece of information to the automated registration arrangement.

13. The apparatus of claim 11, wherein one of the at least two pieces of information is provided to the user by a personal registration authority.

14. The apparatus of claim 11, wherein each of the at least two pieces of information comprises one of either a PIN (Personal Identity Number) or a password.

15. The apparatus of claim 10, wherein one of the at least two pieces of information is provided to the user by a personal registration authority.

16. The apparatus of claim 10, wherein the piece of hardware comprises one of a personal computer or a smart card or a hardware token.

17. The apparatus of claim 10, wherein the automated registration arrangement comprises a special registration Web page.

18. The apparatus of claim 10, wherein the certificate request is validated by a certification authority by verifying that the private key is associated with the predetermined pedigree certificate contained within the provided piece of hardware.

* * * * *